Nov. 3, 1942.　　　W. L. MORGAN　　　2,301,068
PROPORTIONAL DIVIDER
Original Filed March 9, 1932　　2 Sheets-Sheet 1
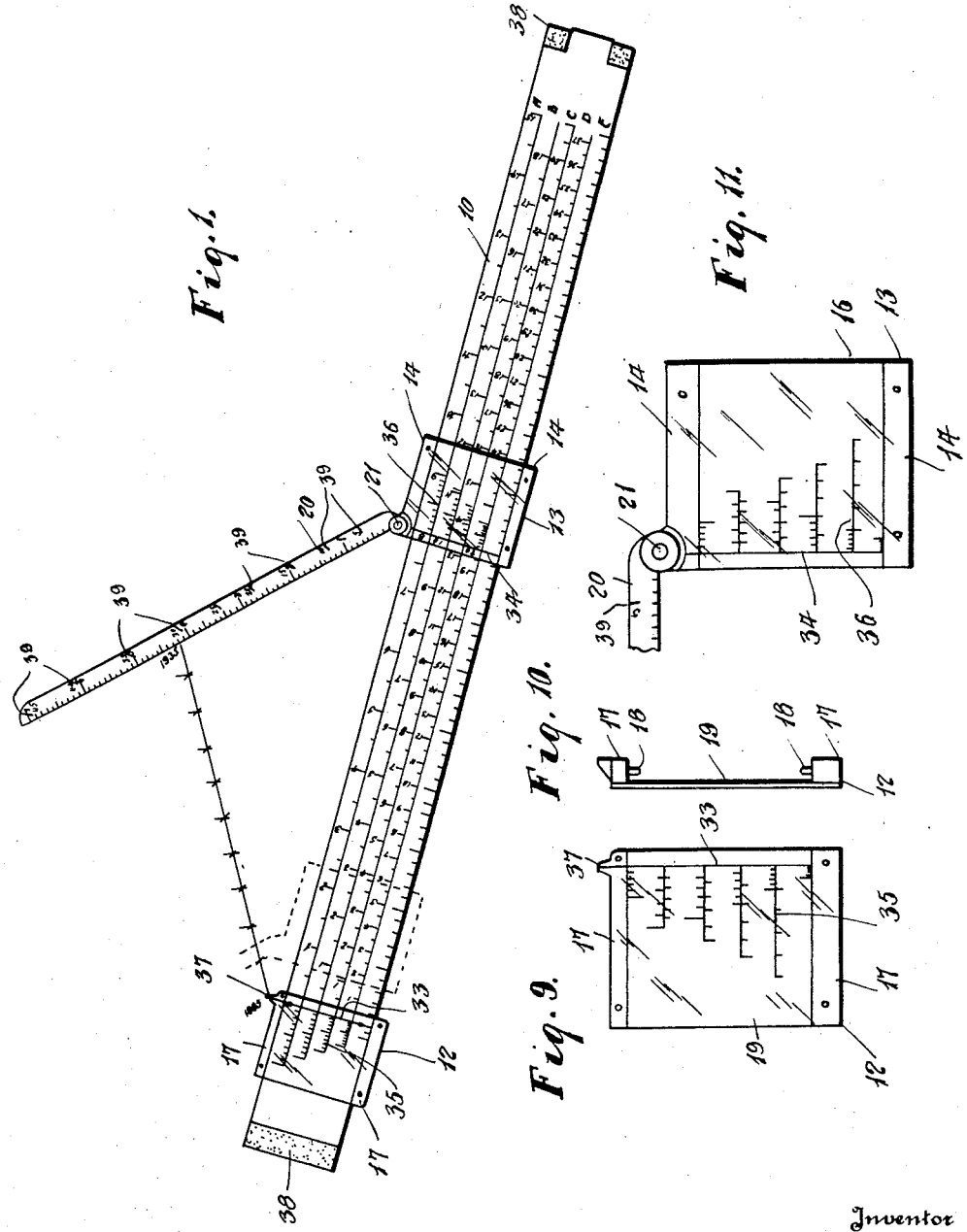
Inventor
W. L. Morgan.

Nov. 3, 1942.　　　　W. L. MORGAN　　　　2,301,068
PROPORTIONAL DIVIDER
Original Filed March 9, 1932　　2 Sheets-Sheet 2
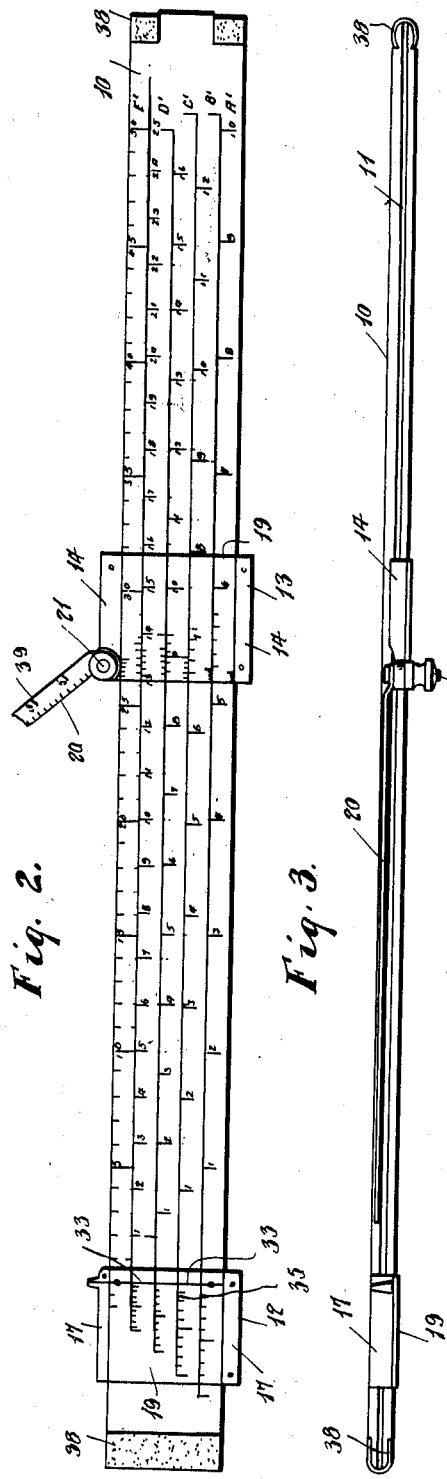
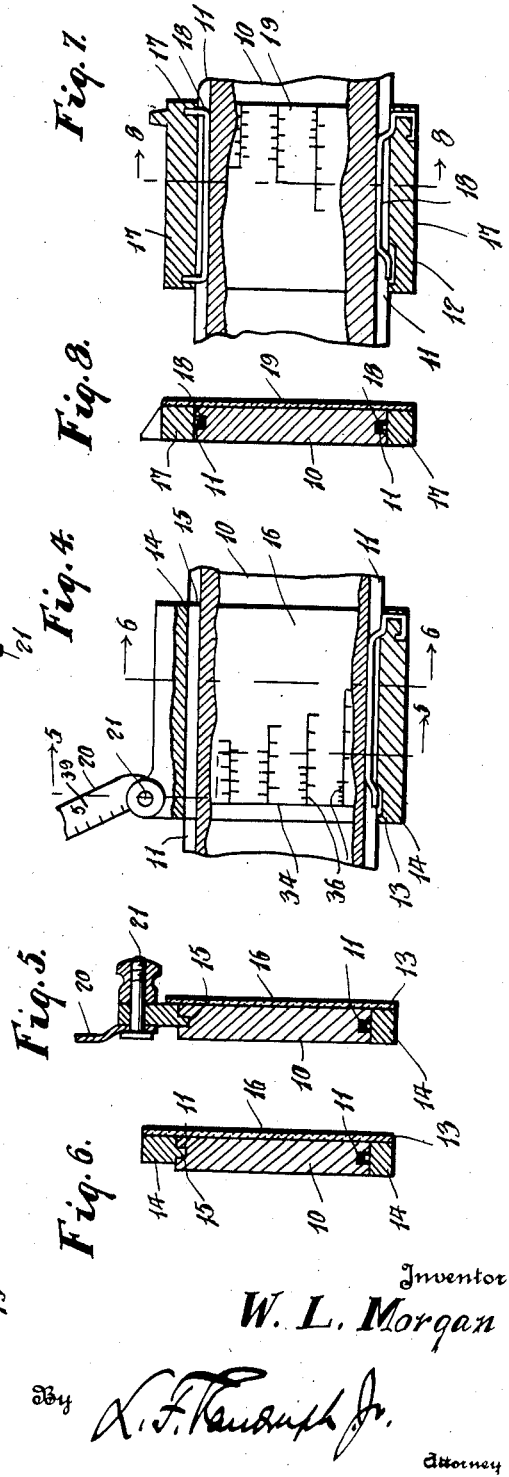
Inventor
W. L. Morgan Patented Nov. 3, 1942

2,301,068

UNITED STATES PATENT OFFICE 2,301,068

PROPORTIONAL DIVIDER

Walter L. Morgan, Phoenix, Ariz.

Substituted for abandoned application Serial No. 597,776, March 9, 1932. This application March 12, 1942, Serial No. 434,448

5 Claims. (Cl. 33—102)

This invention relates to a proportional divider, sub-divider, contour line interpolater or contour meter and generally aims to provide a mechanical means operable to accurately divide a given line into any given number of equal parts, or determine the regular contour intervals, and in any instance where fractional parts of a unit are required at one or both ends of the given distance, same can be accurately determined. The instrument is of such character that it may be used generally in the drafting room for other purposes, such as a parallel line ruler, drawing concentric lines, cross-hatching, shading, arc scribing and the like, and one in which angles can be determined with the instrument itself and dispense with the requirement of a protractor to be used therewith.

This application is a substitute for my prior abandoned application filed March 9, 1932, Serial Number 597,776, and allowed July 19, 1933.

The more specific objects and advantages will become apparent from a consideration of the description following taken in connection with accompanying drawings illustrating an operative embodiment.

In said drawings:

Figure 1 is a plan view showing the invention in use,

Figure 2 is an enlarged plan view of the invention taken from the reverse side of Figure 1 with the slides changed in position, Figure 3 is an edge elevation of the same, Figure 4 is a partial plan and section showing the scale slide and its connection to the bar, Figure 5 is a cross sectional view taken on the line 5—5 of Figure 4, Figure 6 is a cross sectional view taken on the line 6—6 of Figure 4, Figure 7 is a fragmentary view partly in section and partly in elevation, showing the connection between the second slide and the bar, Figure 8 is a cross sectional view taken on the line 8—8 of Figure 7, Figure 9 is a plan view of one of the slides, Figure 10 is an end view of the slide of Figure 9, and Figure 11 is a plan view of the slide carrying the scale arm.

Referring specifically to the drawings, the invention comprises a bar 10 of any suitable material such as wood, metal, xylonite of the like, upon which a number of scales, A, B, C, D, and E are delineated, which scales begin at a common line or zero. The scales mentioned occur on one side of the bar while the reverse side is also graduated with scales but preferably for larger units, and being designated A', B', C', D', and E'. The longitudinal edges of the bar 10 are provided with grooves 11 to accommodate the mounting of slides 12 and 13. Slide 13 consists of bars or strips 14 having tongues 15 extending into the grooves 11 and which bars are connected by a transparent sheet 16, for instance of Celluloid. Slide 12 consists of strips or bars 17 having tongues 18 disposed in the grooves 11 and which bars are connected by a sheet 19 of Celluloid or the like. A suitably graduated scale arm 20 is pivoted at 21 to one of the bars 14 and the rear surface thereof is flushed with adjacent surface of the bar 10 and the bolt 21 is also flush with the latter surface. As a result, the bar 10 and arm 20 may rest flat on a drawing board, paper or supporting surface. Also when the device is not in use or is packed, the arm 20 will engage with and be parallel to one edge of the bar 10, in which position it may be fastened by the bolt 21. The ruling edge of the arm 20 passes through the center of the pivot 21.

In order to frictionally hold the slides in different adjusted positions along the bar 10, one of the tongues 15 and one of the tongues 18 may be a metallic spring as shown.

The sheets or faces 16 and 19 of the slides have index lines 33 and 34, which extends across all of the scales of the bar 10. Subdivided units of the several scales of bar 10, are graduated on the sheets 16 and 19 as shown but extends in opposite directions as at 35 and 36. Said index lines 33 and 34 are as near as practical to the inner edges of the sheets 16 and 19 in order that reading with the two slides may be made near each other. On one bar 17 of the slide 12, a pointer 37 is provided, the end of which terminates on a line running parallel to the bar 10 and passing through the pivot point 21.

Any suitable means may be used on the slide to indicate the particular scale being used at each setting or a color scheme may be used for the same purpose in connection with the various scales of the bar 10.

The construction described permits the slides to be removed and reversed so that they may coact with either side of the bar 10 desired. In addition, at opposite ends of the bar 10, sand paper or the equivalent is secured thereto as at 38, which provides a roughened surface to engage a drawing board or support to prevent accidental slippage of the instrument. Such element 38 also to some extent serves to prevent accidental detachment of the slides 12 and 13.

One use of the device is suggested in Figure 1. After the elevations in the notes made from the field survey are potted according to the field measurements, the instrument is used. To this end, first draw a light pencil line connecting any two points of elevation between which the even foot contour intervals are to be determined. In the example illustrated, the difference in elevation is say 50 feet, at five foot contour intervals, hence there would be ten spaces and inasmuch as these elevations end in 5, (or 0), the index line and pointer of slide 12 can be set at 0—0 on the bar 10. Then place the instrument in any convenient position with the pointer 37 on elevation 1885 as shown in Figure 1, and thereupon select the scale with 10 units nearest corresponding to the horizontal distance between the two elevations.

Set the index line of slide 13 on 10 of scale B and then swing the arm 20 so that the ruling edge will pass through the point at elevation 1935 as shown in Figure 1. Clamp arm 20 in this position and move slide 13 to the numerals 9, 8, 7, etc. and draw a line along arm 20 where the same intersects the light pencil line connecting elevations 1885 and 1935, which intersections are the contour intervals. In the example given scale B was used, but scale C could have been used. The result may be obtained without moving the instrument.

With the graduations or verniers on sheets 16 and 19, decimal parts of the units on the various scales may be determined and after the operator becomes familiar with the use of this instrument, he will find that it will cover the average range of contour-line interpolating.

The device is also capable of use as an angle protractor. This is accomplished by providing arm 20 with a series of lines 39 adjacent to its rear or upper edge that may be supplied with numeral indications arranged progressively outwardly from the pivot 21 as shown in Figure 1, that is 5, 10, 15, and so on to 45 adjacent to the outer end of the arm. Then by securing slide 13 on bar 10 at a point thereon that the line indicated 45 will touch pointer 37 when arm 20 is parallel with the bar and then fixing the arm at right angles to the different angles may be scribed with a straight edge using pointer 37 and lines 39 as guides for the straight edge.

Various other uses may be made of the apparatus or instrument and changes may be resorted to within the spirit and scope of the invention. For instance, the principle used in the device may also be applied to a device of cylindrical design.

I claim as my invention:

1. An instrument of the class described comprising a bar having scales thereon, slides movable along the bar having index lines relatively close to their inner ends, said slides having scales thereon constituting subdivided units of the first mentioned scales and extending in opposite directions from the respective index lines.

2. An instrument of the class described comprising a bar having scales of multiple ratios thereon, slides movable along the bar having index lines relatively close to their inner ends, said slides having scales thereon constituting subdivided units of the first mentioned scales and extending in opposite directions from the respective index lines, and a scale arm pivotally attached to and extending from one of the slides.

3. An instrument of the class described comprising a bar having scales of multiple ratios thereon, slides movable along the bar having index lines relatively close to their inner ends, said slides having scales thereon constituting subdivided units of the first mentioned scales and extending in opposite directions from the respective index lines, and a scale arm pivotally attached to and extending from one of the slides and having one face thereof flush with one face of the bar whereby the same may engage a supporting surface, said bar having grooves, tongue means on the slides engaged in said grooves, said tongue means enabling the slides to be removed and reversed.

4. An instrument of the class described comprising a bar having scales of multiple ratios thereon, slides movable along the bar having index lines relatively close to their inner ends, said slides having scales thereon constituting subdivided units of the first mentioned scales and extending in opposite directions from the respective index lines, and a scale arm pivotally attached to and extending from one of the slides and having one face thereof flush with one face of the bar whereby the same may engage a supporting surface, and said bar having a roughened surface adjacent opposite ends for the purpose specified.

5. An instrument of the class described comprising a bar having scales of multiple ratios thereon, slides movable along the bar having index lines relatively close to their inner ends, said slides having scales thereon constituting subdivided units of the first mentioned scales and extending in opposite directions from the respective index lines, and the scale arm pivotally attached to and extending from one of the slides and having one face thereof flush with one face of the bar whereby the same may engage a supporting surface, said slides having index lines thereon, and one of the slides having a pointer on a line with the pivotal axis of the scale arm of the other slide.

WALTER L. MORGAN.